(12) United States Patent
Koh

(10) Patent No.: US 10,797,347 B2
(45) Date of Patent: Oct. 6, 2020

(54) ELECTROLYTE COMPRISING PHTHALATE PHOSPHINE-BASED ANIONS, ADDITIVE FOR SECONDARY BATTERY COMPRISING SAME, AND SECONDARY BATTERY COMPRISING SAME

(71) Applicant: LG Chem, Ltd., Seoul (KR)

(72) Inventor: Jeong Hwan Koh, Daejeon (KR)

(73) Assignee: LG Chem, Ltd. (KR)

( * ) Notice: Subject to any disclaimer, the term of this patent is extended or adjusted under 35 U.S.C. 154(b) by 653 days.

(21) Appl. No.: 15/025,813

(22) PCT Filed: Sep. 30, 2014

(86) PCT No.: PCT/KR2014/009160
§ 371 (c)(1),
(2) Date: Mar. 29, 2016

(87) PCT Pub. No.: WO2015/047010
PCT Pub. Date: Apr. 2, 2015

(65) Prior Publication Data
US 2016/0218393 A1   Jul. 28, 2016

(30) Foreign Application Priority Data
Sep. 30, 2013   (KR) .......................... 10-2013-0116115

(51) Int. Cl.
*H01M 10/0567* (2010.01)
*H01M 10/0566* (2010.01)
(Continued)

(52) U.S. Cl.
CPC ..... *H01M 10/0567* (2013.01); *C07F 9/65744* (2013.01); *C07F 9/65748* (2013.01); *H01M 2/1673* (2013.01); *H01M 10/052* (2013.01); *H01M 10/0525* (2013.01); *H01M 2300/0017* (2013.01); *H01M 2300/0025* (2013.01); *Y02T 10/7011* (2013.01)

(58) Field of Classification Search
None
See application file for complete search history.

(56) References Cited

U.S. PATENT DOCUMENTS 7,749,660 B2    7/2010  Lee et al.
2002/0081496 A1*  6/2002  Tsujioka ................. C07F 5/022
                                                              429/307

(Continued)

FOREIGN PATENT DOCUMENTS

EP         1842853 A1    10/2007
JP       2004/111349    *  4/2004 ............. H01G 11/06

(Continued)

OTHER PUBLICATIONS

English translation of JP 2004/111349 (Year: 2004).*

(Continued)

*Primary Examiner* — Yoshitoshi Takeuchi
(74) *Attorney, Agent, or Firm* — Lerner, David, Littenberg, Krumholz & Mentlik, LLP

(57) ABSTRACT

The present specification provides an electrolyte including a phthalate phosphine-type anion, an additive for a secondary battery including the electrolyte, and a secondary battery including the additive.

11 Claims, 2 Drawing Sheets

(51) Int. Cl.
*H01M 10/0564* (2010.01)
*H01M 10/052* (2010.01)
*C07F 9/6574* (2006.01)
*H01M 2/16* (2006.01)
*H01M 10/0525* (2010.01)

(56) References Cited

U.S. PATENT DOCUMENTS

2003/0100761 A1* 5/2003 Tsujioka ................ C07F 5/022
  544/225
2005/0095503 A1  5/2005 Adachi et al.
2008/0081262 A1  4/2008 Kitao et al.

FOREIGN PATENT DOCUMENTS

| | | |
|---|---|---|
| JP | 2004111349 A | 4/2004 |
| JP | 2008091236 A | 4/2008 |
| JP | 2008166342 A | 7/2008 |
| JP | 2010282836 A | 12/2010 |
| JP | 2012064397 A | 3/2012 |
| KR | 100991424 B1 | 11/2010 |
| KR | 101082152 B1 | 11/2011 |

OTHER PUBLICATIONS

Supplementary European Search Report for Application No. EP14849596, dated Feb. 3, 2017.
Search Report from Office Action from Taiwanese Patent Application No. 103134033, dated Jul. 2, 2015.
International Search Report from PCT/KR2014/009160, dated Feb. 24, 2015.

* cited by examiner

[Fig. 1]
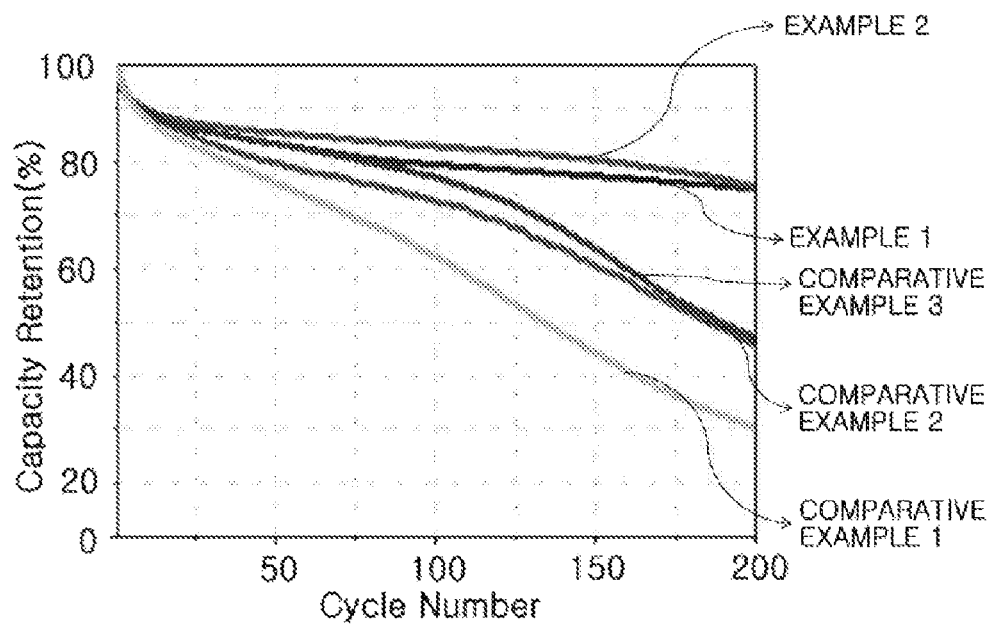

[Fig. 2]
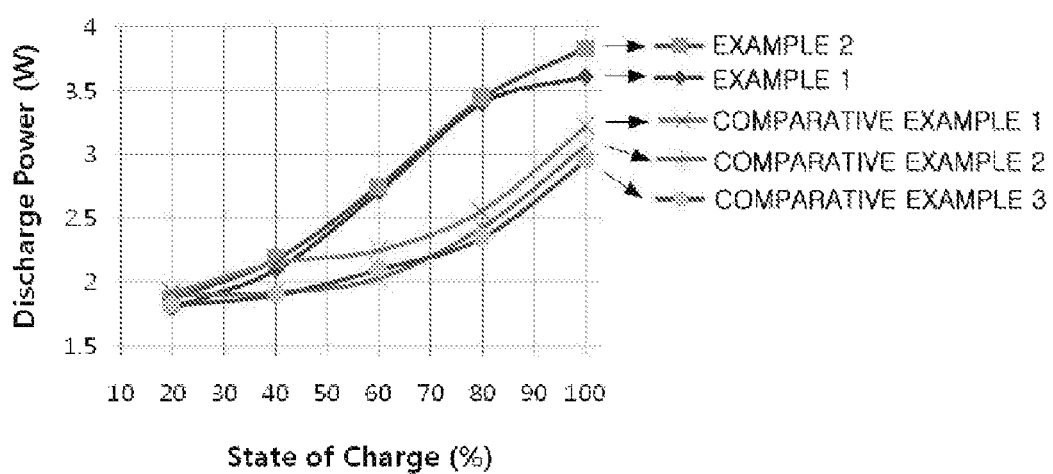

ELECTROLYTE COMPRISING PHTHALATE PHOSPHINE-BASED ANIONS, ADDITIVE FOR SECONDARY BATTERY COMPRISING SAME, AND SECONDARY BATTERY COMPRISING SAME

CROSS-REFERENCE TO RELATED APPLICATION

The present application is a national phase entry under 35 U.S.C. § 371 of International Application No. PCT/KR2014/009160, filed Sep. 30, 2014, which claims priority to Korean Patent Application No. 10-2013-0116115, filed Sep. 30, 2013, the entire contents of which are incorporated herein by reference.

TECHNICAL FIELD

The present specification relates to an electrolyte including a phthalate phosphine-type anion, an additive for a secondary battery including the electrolyte, and a secondary battery including the additive.

BACKGROUND ART

Lithium secondary batteries form the core of portable power supplies, and the importance of lithium secondary batteries as a power source of electronic devices, various power storage devices, electric vehicles and hybrid vehicles is growing. When examining recent applications for lithium secondary batteries, applications in large- and medium-sized devices that require mass power, and power storage devices for power supply have greatly increased with the applications in mobile telecommunication and information devices, and examples thereof include electric vehicles, hybrid vehicles, electric machine tools, and power storage devices for housing and industry. In such new applications, needs for the enhancement of performances depending on the applications have increased in addition to basic performances required for previous small portable electronic devices.

As for the properties required for such lithium secondary batteries, a cycle retention property at high temperatures, together with a cycle capacity retention property related to the life span of a battery, is one of the important required properties relating to the expansion of lithium secondary battery applications. These properties are highly related to the properties of a membrane formed on the electrode surface by electrolyte components and an electrode active material on anode and cathode surfaces due to oxidation and reduction when a battery is charged and discharged, and various compounds are used as an electrolyte component for electrode protection and stabilization due to such membrane properties.

For the cycle capacity retention of a lithium secondary battery at high temperatures, a solid electrolyte interface (SEI) membrane produced by the electrical reduction of an organic solvent when charging a battery may be used. The SEI membrane may be effective in maintaining cycle properties in an electrode by preventing the decomposition of an electrolyte and preventing the irreversible loss of the electrode surface. However, the increase of resistance inside a battery is induced by the SEI membrane and it may become a factor degrading battery performances.

Japanese Patent Application Laid-Open Publication No. 2008-091236 and Japanese Patent Application Laid-Open Publication No. 2012-064397 disclose oxalato borate and oxalato phosphate lithium salts and derivatives as a novel electrolyte component, and these components are effective in battery cycle properties but have a problem of accompanying resistance increase, which may cause power output decrease.

Accordingly, the development of a battery using an electrolyte component having no power output decrease while improving the cycle properties of a lithium secondary battery at room temperature and high temperatures has been required.

PRIOR ART DOCUMENTS

Patent Documents

Japanese Patent Application Laid-Open Publication No. 2008-091236
Japanese Patent Application Laid-Open Publication No. 2012-064397

DISCLOSURE

Technical Problem

The inventors of the present disclosure provide an electrolyte capable of solving the problems described above, an additive for a secondary battery including the electrolyte, and a secondary battery including the additive.

Technical Solution

One embodiment of the present specification provides an electrolyte including a lithium cation; and a phthalate phosphine-type anion substituted at least one fluorine.

In addition, one embodiment of the present specification provides an electrode, wherein a solid electrolyte interface (SEI) membrane, which is formed by electrically reducing a lithium cation and a phthalate phosphine-type anion substituted at least one fluorine, is formed on a part or all of the electrode surface.

Furthermore, one embodiment of the present specification provides an additive for a secondary battery including a lithium cation; and a phthalate phosphine-type anion substituted at least one fluorine.

In addition, one embodiment of the present specification provides a secondary battery including an anode, a cathode, a separator and an electrolyte, wherein the electrolyte includes the lithium cation and the phthalate phosphine-type anion.

Advantageous Effects

An electrolyte according to one embodiment of the present specification can improve the stability of a secondary battery thereby improve the cycle performances of a secondary battery.

An electrolyte according to one embodiment of the present specification can minimize the reduction of a secondary battery capacity even at high temperatures, and accordingly, a secondary battery including the electrolyte has an advantage of having superior capacity retention properties at high temperatures.

An electrolyte according to one embodiment of the present specification can protect an electrode by forming an SEI membrane on the electrode surface, and minimize the power output decrease of a secondary battery caused by resistance increase due to the SEI membrane.

An electrolyte according to one embodiment of the present specification can improve the life span of a secondary battery at high temperatures and maintain superior power output, since, when an SEI membrane is formed, the SEI membrane has excellent lithium ion permeability.

DESCRIPTION OF DRAWINGS

FIG. 1 is a graph obtained by plotting the relation between a capacity and a cycle number of a secondary battery according to Test Example 2 of the present specification.

FIG. 2 is a graph obtained by plotting power output (power (W)) of a secondary battery with respect to a state of charge according to Test Example 2 of the present specification.

MODE FOR DISCLOSURE

Hereinafter, the present specification will be described in more detail.

When the present specification describes that certain parts "include" certain constituents, this means further including other constituents rather than excluding other constituents, unless specifically described on the contrary.

one embodiment of the present specification provides an electrolyte including a lithium cation; and a phthalate phosphine-type anion substituted at least one fluorine.

According to one embodiment of the present specification, the lithium cation and the phthalate phosphine-type anion may be included in a dissociated state in the electrolyte.

According to one embodiment of the present specification, the phthalate phosphine-type anion may be represented by any one of the following Chemical Formulae 1 to 3.

[Chemical Formula 1]

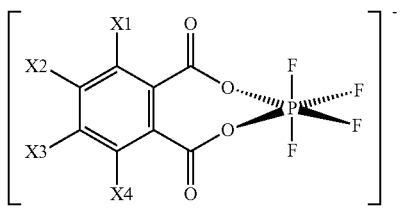

[Chemical Formula 2]

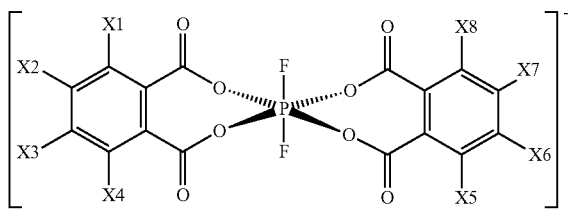

[Chemical Formula 3]

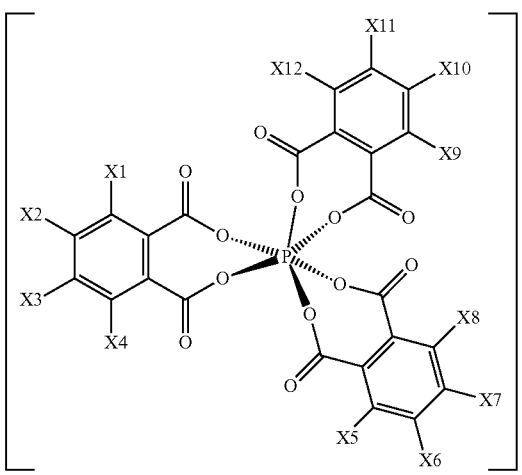

In Chemical Formula 1, $X1$ to $X4$ are each independently hydrogen; a halogen group; an alkyl group having 1 to 20 carbon atoms; or a nitrile group (—CN).

In Chemical Formula 2, $X1$ to $X8$ are each independently hydrogen; a halogen group; an alkyl group having 1 to 20 carbon atoms; or a nitrile group (—CN).

In Chemical Formula 3, at least one of $X1$ to $X12$ is fluorine, and the rest are each independently hydrogen; a halogen group; an alkyl group having 1 to 20 carbon atoms; or a nitrile group (—CN).

According to one embodiment of the present specification, at least one of $X1$ to $X4$ in Chemical Formula 1 may be fluorine. Alternatively, according to one embodiment of the present specification, $X1$ to $X4$ in Chemical Formula 1 may all be fluorine. Alternatively, according to one embodiment of the present specification, $X1$ to $X4$ in Chemical Formula 1 may all be hydrogen.

According to one embodiment of the present specification, at least one of $X1$ to $X8$ in Chemical Formula 2 may be fluorine. Alternatively, according to one embodiment of the present specification, $X1$ to $X8$ in Chemical Formula 2 may all be fluorine. Alternatively, according to one embodiment of the present specification, $X1$ to $X8$ in Chemical Formula 2 may all be hydrogen.

According to one embodiment of the present specification, at least one of $X1$ to $X12$ in Chemical Formula 3 may be fluorine. Alternatively, according to one embodiment of the present specification, $X1$ to $X12$ in Chemical Formula 3 may all be fluorine. Alternatively, according to one embodiment of the present specification, at least one of $X1$ to $X12$ in Chemical Formula 3 is fluorine, and the rest may all be hydrogen.

According to one embodiment of the present specification, the electrolyte may include a compound of the phthalate phosphine-type anion and the lithium cation.

Specifically, according to one embodiment of the present specification, the electrolyte may include a compound of the anion represented by any one of Chemical Formulae 1 to 3 and the lithium cation.

According to one embodiment of the present specification, a compound of the lithium cation and the phthalate phosphine-type anion may be added to the electrolyte.

According to one embodiment of the present specification, a compound of the phthalate phosphine-type anion and the lithium cation may be included as an additive of the electrolyte. Specifically, according to one embodiment of the present specification, a compound of the phthalate phosphine-type anion and the lithium cation is dissociated by the electrolyte and plays a role of assisting the function of the electrolyte.

The phthalate phosphine-type anion of the present specification has a structure in which a phthalate group, or a derivative having a substituent in the aromatic ring of the phthalate group, is coordinated to phosphorous (P).

According to one embodiment of the present specification, the phthalate phosphine-type anion may form a solid electrolyte interface (SEI) membrane by electrical reduction. Specifically, the SEI membrane may be formed on a part or all of an electrode surface. More specifically, the SEI membrane may be formed on a part or all of an anode surface.

In a secondary battery including the electrolyte according to one embodiment of the present specification, the phthalate phosphine-type anion may form an organic lithium salt-type SEI membrane including an aromatic ring when the anion is dissociated in an electrode and the dissociation of the phthalate group is progressed while forming an SEI membrane. Specifically, according to one embodiment of the present specification, the phthalate phosphine-type anion may be dissociated on an anode. More specifically, the phthalate phosphine-type anion may form an SEI membrane having relatively favorable interface affinity on an anode carbon surface.

The SEI membrane exhibits membrane properties having a relatively improved protection effect at the interface compared to linear decarboxyl phosphate compounds, that is, oxalato borate compounds disclosed in the prior art document. Specifically, the SEI membrane may effectively block the continuous electrode reactions of linear and cyclic carbonate solvents and prevent the non-reversible loss of an electrode active material, therefore, may improve secondary battery performances.

The phthalate phosphine-type anion in the electrolyte according to one embodiment of the present specification includes a ring-type structure formed with two carboxyl groups and phosphorous. This is a septagonal ring and is deviated from thermodynamically stable pentagonal and hexagonal ring shapes. Particularly, ring stability of a septagonal ring rapidly decreases causing most rapid opening of the ring, which may lead to additional reactions. Due to these structural characteristics, the phthalate phosphine-type anion is present as the stable phthalate phosphine-type anion or a compound of the phthalate phosphine-type anion and the lithium cation before being charged in an electrolyte, however, when charged, the phthalate phosphine-type anion forms an organic lithium salt membrane while a dissociation reaction most rapidly occurs on an electrode surface, specifically, an anode surface.

According to one embodiment of the present specification, in order to minimize the increase of electrode resistance while forming stable SEI and thereby minimize the decrease of power output and rate properties, the phthalate group of the phthalate-type compound may be fluorinated, or a compound in which phosphorous is fluorinated may be included.

According to one embodiment of the present specification, the phthalate phosphine-type anion represented by Chemical Formula 1 or Chemical Formula 2 includes a tetrafluorophosphate form and a difluorobisphosphate form, respectively. Due to such a structure, a chemically stable membrane having high polarity may be formed when an SEI membrane is formed on an electrode surface since a membrane having high fluorine ion content is formed. Accordingly, there is an advantage of improving lithium ion conductance at the interface of an electrolyte and an electrode, and improving chemical stability. Specifically, the electrode may be an anode.

Due to the reasons described above, according to one embodiment of the present specification, the phthalate phosphine-type anion represented by Chemical Formulae 1 and 2 may form a superior SEI membrane. In addition, according to one embodiment of the present specification, in the case of Chemical Formula 3, a superior SEI membrane may be formed when the phthalate group is substituted with fluorine.

According to one embodiment of the present specification, the electrolyte may include the compound of the lithium cation and the phthalate phosphine-type anion in greater than or equal to 0.01 wt % and less than or equal to 10 wt % with respect to the whole electrolyte. Specifically, according to one embodiment of the present specification, the electrolyte may include the compound of the lithium cation and the phthalate phosphine-type anion in greater than or equal to 0.01 wt % and less than or equal to 5 wt % with respect to the whole electrolyte.

When the compound is added within the above range, an SEI membrane having excellent properties may be formed. Specifically, when the content is less than 0.01 wt % with respect to the whole electrolyte, the life span improvement effect and the performance improvement effect at high temperatures of a secondary battery may be insignificant. In addition, when the content is greater than 10 wt % with respect to the whole electrolyte, precipitates may be produced due to a solubility limit.

According to one embodiment of the present specification, the compound of the lithium cation and the phthalate phosphine-type anion may all be dissociated in the electrolyte. Therefore, the content of the phthalate phosphine-type anion compound in the electrolyte may be the same as the equivalent of the phthalate phosphine-type anion in the compound of the lithium cation and the phthalate phosphine-type anion.

According to one embodiment of the present specification, the electrolyte may further include an electrolyte salt and an electrolyte solvent.

According to one embodiment of the present specification, the electrolyte salt may be a salt including a lithium cation, and an anion such as $PF_6^-$, $BF_4^-$, $Cl^-$, $Br^-$, $I^-$, $ClO_4^-$, $AsF_6^-$, $SO_3CF_3^-$, $N(SO_2CF_3)_2^-$ and $N(SO_2F)_2^-$ or an ion formed with a combination of one or more of these.

According to one embodiment of the present specification, the electrolyte solvent may include an organic solvent. Specifically, cyclic carbonate, linear carbonate, cyclic ester, linear ester and a combination thereof may be included. More specifically, non-limiting examples of the electrolyte solvent may include propylene carbonate (PC), ethylene carbonate (EC), diethyl carbonate (DEC), dimethyl carbonate (DMC), ethylmethyl carbonate (EMC), dipropyl carbonate (DPC), dimethyl sulfoxide, acetonitrile, dimethoxyethane, diethoxyethane, tetrahydrofuran (THF), N-methyl-2-pyrrolidone (NMP), gamma butyrolactone (GBL), fluoroethylene carbonate (FEC), methyl formate, ethyl formate, propyl formate, methyl acetate, ethyl acetate, propyl acetate, butyl acetate or a mixture of one or more of these. In addition, halogen derivatives of the organic solvent may also be used.

According to one embodiment of the present specification, the electrolyte may be a non-aqueous electrolyte.

According to one embodiment of the present specification, the electrolyte may be for a secondary battery. Specifically, the electrolyte may be for a lithium secondary battery.

One embodiment of the present specification provides an electrode, wherein a solid electrolyte interface (SEI) membrane, which is formed by electrically reducing a lithium cation and a phthalate phosphine-type anion substituted at least one fluorine, is formed on a part or all of the electrode surface.

According to one embodiment of the present specification, the phthalate phosphine-type anion may include a compound represented by any one of Chemical Formulae 1 to 3 described above.

According to one embodiment of the present specification, the electrode may be an anode, a cathode, or an anode and a cathode. Specifically, according to one embodiment of the present specification, the electrode in which the SEI membrane is formed on a part or all of the electrode surface may be an anode.

One embodiment of the present specification provides an additive for a secondary battery including a lithium cation; and a phthalate phosphine-type anion substituted at least one fluorine.

According to one embodiment of the present specification, the additive for a secondary battery may include a compound represented by any one of the following Chemical Formulae 1-1 to 3-1.

[Chemical Formula 1-1]

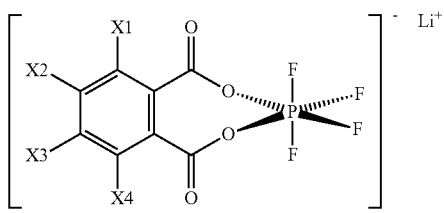

[Chemical Formula 2-1]

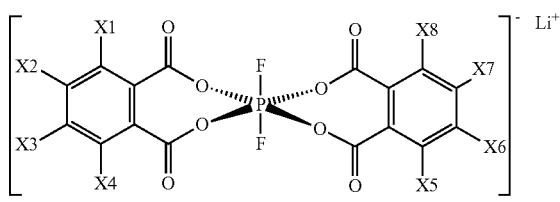

[Chemical Formula 3-1]

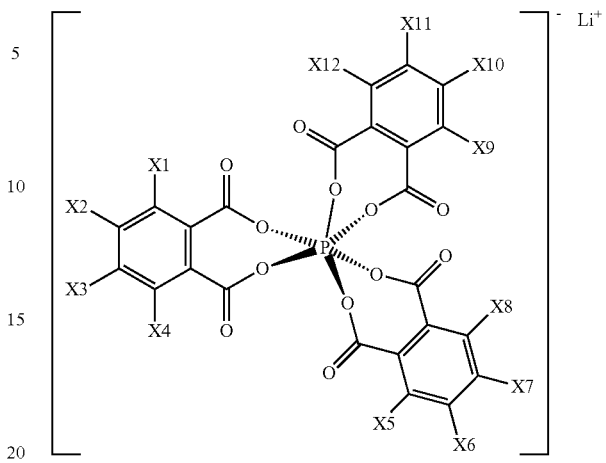

In Chemical Formula 1-1, X1 to X4 are each independently hydrogen; a halogen group; an alkyl group having 1 to 20 carbon atoms; or a nitrile group (—CN).

In Chemical Formula 2-1, X1 to X8 are each independently hydrogen; a halogen group; an alkyl group having 1 to 20 carbon atoms; or a nitrile group (—CN).

In Chemical Formula 3-1, at least one of X1 to X12 is fluorine, and the rest are each independently hydrogen; a halogen group; an alkyl group having 1 to 20 carbon atoms; or a nitrile group (—CN).

According to one embodiment of the present specification, the additive for a secondary battery may include an additive for a lithium secondary battery.

According to one embodiment of the present specification, the additive for a secondary battery may be included in an electrolyte in a compound state of a secondary battery or in a dissociated state. Specifically, the additive for a secondary battery according to one embodiment of the present specification may include an additive of an electrolyte of a secondary battery.

The additive for a secondary battery according to one embodiment of the present specification may be included in a secondary battery and protect an electrode by forming an SEI membrane on the electrode surface, and may minimize the power output decrease of a secondary battery caused by the resistance increase due to the SEI membrane.

In addition, when the additive for a secondary battery according to one embodiment of the present specification is included in a secondary battery and forms an SEI membrane, the SEI membrane has excellent lithium ion permeability, and therefore, the life span of the secondary battery at high temperatures may be improved and excellent power output may be maintained.

One embodiment of the present specification provides a secondary battery including an anode, a cathode, a separator and an electrolyte, wherein the electrolyte is an electrolyte including the lithium cation and the phthalate phosphine-type anion.

According to one embodiment of the present specification, at least one of the anode and the cathode may be an electrode in which a solid electrolyte interface (SEI) membrane, which is formed by electrically reducing the lithium cation; and the phthalate phosphine-type anion substituted at least one fluorine, is formed on a part or all of the electrode surface.

According to one embodiment of the present specification, the secondary battery may include a lithium secondary battery.

According to one embodiment of the present specification, the anode may be prepared using a method in which slurry is prepared by mixing and stirring an anode active material, a binder, a solvent, a conductor and a dispersant prepared using general methods, and the result is coated on a collector of a metal material and then compressed and dried.

According to one embodiment of the present specification, the anode active material may use common anode active materials capable of being used in an anode of existing secondary batteries. Non-limiting examples of the anode active material may include lithium metal or lithium metal alloys, lithium absorbing materials such as coke, activated carbon, graphite, graphitized carbon, carbon nanotubes, or graphine and other carbon types. As the anode collector, copper, nickel and the like, and foil using a combination of alloys thereof may be used.

According to one embodiment of the present specification, the cathode may be prepared in a form of a cathode active material being coated on a cathode collector according to general methods. The cathode active material may use common materials used as a cathode active material of a secondary battery without limit, and examples thereof may include $LiCoO_2$, $LiMnO_2$, $LiMn_2O_4$, $Li(Ni_aCo_bMn_c)O_2$ (a, b and c are each independently a number ranging from 0 to 1, and a+b+c=1), $LiFePO_4$ or a mixture of one or more of these. The cathode collector may include aluminum, nickel and the like, and foil using a combination of alloys thereof.

According to one embodiment of the present specification, the separator is not particularly limited, and may have a porous membrane form. Specifically, the separator may be formed with a polyethylene membrane, a polypropylene membrane, other polyolefin-type membranes or a multilayer membrane of these. In addition, the separator coated with ceramic may be used.

The secondary battery according to one embodiment of the present specification may be prepared using common methods known in the art, and may be prepared by injecting an electrolyte to a cylinder-shaped, square-shaped or pouch-shaped case that is assembled including the cathode, the anode and the separator.

The secondary battery according to one embodiment of the present specification forms, as described above, an SEI membrane having excellent electrode protection properties and lithium ion permeability formed by the phthalate-type compound, and therefore, the secondary battery is effective for capacity retention at high temperatures, and is effective in preventing power output decrease.

Hereinafter, the present specification will be described in detail with reference to examples. However, the examples according to the present specification may be modified to various other forms, and the scope of the present specification is not interpreted to be limited to the examples described below. The examples of the present specification are provided in order to more completely describe the present specification for those having average knowledge in the art.

Example 1

An electrolyte was prepared by adding 1 wt % of a compound represented by the following Chemical Formula 1-2 to a solution of ethylene carbonate having a 1 M $LiPF_6$ concentration and ethylmethyl carbonate in a volume ratio of 1:2.

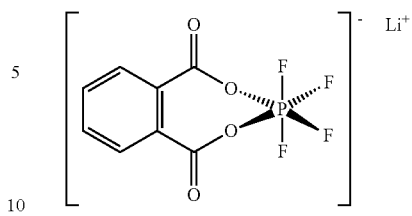

[Chemical Formula 1-2]

As an anode, 90 wt % of graphite carbon and 10 wt % of polyvinylidene difluoride (PVDF) were placed in N-methyl-2-pyrrolidone (NMP) and mixed for 2 hours in a mixer, and then the result was coated on copper foil and dried at 150° C. A cathode was prepared by mixing 90 wt % of $LiCoO_2$, 3 wt % of PVDF and 7 wt % of carbon black for 2 hours as NMP slurry, coating the result on aluminum foil, and drying the result at 150° C. A cylinder-shaped secondary battery was manufactured by placing a polyolefin type separator in between the prepared the anode and the cathode, and then injecting the electrolyte thereto.

Example 2

An electrolyte and a secondary battery were prepared in the same manner as in Example 1 except that the electrolyte was prepared using a compound represented by the following Chemical Formula 2-2 in 1 wt % instead of the compound represented by Chemical Formula 1-2 of Example 1.

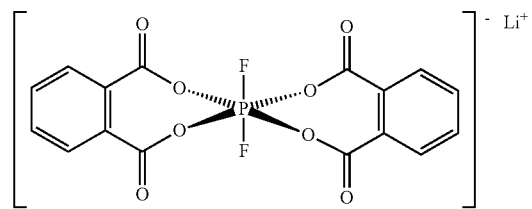

[Chemical Formula 2-2]

Comparative Example 1

A secondary battery was prepared in the same manner as in Example 1 except that an electrolyte was a solution of ethylene carbonate having a 1 M $LiPF_6$ concentration and ethylmethyl carbonate in a 1:2 volume ratio, and no other materials were added thereto.

Comparative Example 2

An electrolyte was prepared by adding lithium bisoxalato borate to the electrolyte of Comparative Example 1 in 1 wt %, and a secondary battery was prepared in the same manner as in Example 1 using this electrolyte.

Comparative Example 3

An electrolyte was prepared by adding lithium difluoro-bisoxalato phosphate to the electrolyte of Comparative Example 1 in 1 wt %, and a battery was prepared in the same manner as in Example 1 using this electrolyte.

Test Example 1

Performance Evaluation of Secondary Battery

The following tests were carried out for each secondary battery prepared in Examples 1 and 2 and Comparative Examples 1 to 3. For each secondary battery, changes in the battery discharge capacity were measured by repeating charge and discharge in a range of 4.2 V and 3 V with a current of 0.5 C at a high temperature (45° C.). Discharge capacity retention rates after 200 charge and discharge cycles were shown in the following Table 1 and FIG. 1.

TABLE 1

| | Added Material | Discharge Capacity Retention Rate (%) |
|---|---|---|
| Example 1 | Chemical Formula 1-2 | 76.8 |
| Example 2 | Chemical Formula 2-2 | 78.1 |
| Comparative Example 1 | — | 30.2 |
| Comparative Example 2 | Lithium Bisoxalato Borate | 46.6 |
| Comparative Example 3 | Lithium Difluorobisoxalato Phosphate | 48.1 |

When comparing the test results, Examples 1 and 2 all exhibited more excellent discharge retention compared to Comparative Example 1 having no additive materials. Particularly, the compound represented by Chemical Formula 2-2 exhibited most superior result. This shows that, even when identical phthalate groups are included, a compound of a lithium cation and a phthalate phosphine-type anion including a fluoride group is effective in discharge capacity retention. Particularly, Examples 1 and 2 exhibited a more superior capacity retention effect compared to Comparative Example 3 using lithium difluorobisoxalato phosphate.

Test Example 2

For the secondary batteries prepared from Examples 1 and 2 and Comparative Examples 1 to 3, discharge power outputs at 25° C. were compared. The power output measurement results in 100%, 80%, 60%, 40% and 20% charged states compared to a fully charged state are shown in FIG. 2.

FIG. 2 is a graph obtained by plotting the relation between a state of charge according to Test Example 2 and a discharge output, and from the result of FIG. 2, it is shown that a secondary battery using the compound represented by Chemical Formula 2-2 of Example 2 exhibits most superior power output. In Comparative Examples 2 and 3, power output decreases were shown when compared to Comparative Example 1, however, Examples 1 to 3 showed improved power outputs compared to Comparative Example 1. From the test results shown above, it is demonstrated that a secondary battery including an electrolyte in which a compound of the lithium cation and the phthalate phosphine-type anion of the present specification is added has excellent high cycle performances and is significantly effective in maintaining power output.

The invention claimed is:

1. An electrolyte comprising:
a lithium cation;
a phthalate phosphine-type anion;
an electrolyte salt; and
an electrolyte solvent having ethylene carbonate (EC) and ethylmethyl carbonate (EMC),
wherein the phthalate phosphine-type anion is represented by following Chemical Formula 2,
wherein the lithium cation and the phthalate phosphine-type anion are present in an amount of 1 wt % to less than or equal to 10 wt % with respect to the whole electrolyte,

[Chemical Formula 2]

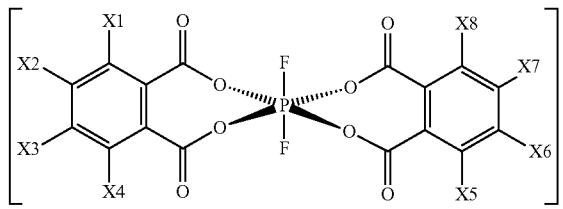

in Chemical Formula 2, X1 to X8 are hydrogen,
wherein EC and EMC are present in the electrolyte solvent in a volume ratio of 1:2,
wherein the lithium cation and the phthalate phosphine-type anion are present in an amount of 1 wt % with respect to the whole electrolyte, and
wherein the electrolyte salt comprises $LiPF_6$ present in a concentration of 1M with respect to the electrolytic solvent.

2. The electrolyte of claim 1, wherein the lithium cation and the phthalate phosphine-type anion are included in a dissociated state in the electrolyte.

3. The electrolyte of claim 1, comprising:
a compound of the phthalate phosphine-type anion and the lithium cation.

4. The electrolyte of claim 1, wherein the lithium cation and the phthalate phosphine-type anion form a solid electrolyte interface (SEI) membrane by electrical reduction.

5. The electrolyte of claim 1, wherein the electrolyte is a non-aqueous electrolyte.

6. The electrolyte of claim 1, which is for a secondary battery.

7. A secondary battery comprising an anode, a cathode, a separator and an electrolyte, wherein the electrolyte is the electrolyte of claim 1.

8. The secondary battery of claim 7, wherein at least one of the anode or the cathode has a solid electrolyte interface (SEI) membrane formed on a part or all of the surface thereof, wherein the SEI membrane is formed by electrically reducing the lithium cation and the phthalate phosphine-type anion.

9. The secondary battery of claim 7, wherein the secondary battery is a lithium secondary battery.

10. The electrolyte of claim 1, wherein the electrolyte salt comprises $LiPF_6$.

11. The electrolyte of claim 1,
wherein the electrolyte solvent consists of EC and EMC.

* * * * *